(12) United States Patent
Fortell et al.

(10) Patent No.: US 8,588,981 B2
(45) Date of Patent: Nov. 19, 2013

(54) SYSTEM OF MANIPULATORS AND METHOD FOR CONTROLLING SUCH A SYSTEM

(75) Inventors: Håkan Fortell, Västerås (SE); Henrik Jerregård, Västerås (SE)

(73) Assignee: ABB AB, Västerås (SE)

( * ) Notice: Subject to any disclaimer, the term of this patent is extended or adjusted under 35 U.S.C. 154(b) by 1215 days.

(21) Appl. No.: 10/593,272

(22) PCT Filed: Mar. 16, 2005

(86) PCT No.: PCT/EP2005/051218
§ 371 (c)(1),
(2), (4) Date: Aug. 26, 2008

(87) PCT Pub. No.: WO2005/090010
PCT Pub. Date: Sep. 29, 2005

(65) Prior Publication Data
US 2008/0306630 A1    Dec. 11, 2008

Related U.S. Application Data

(60) Provisional application No. 60/533,135, filed on Dec. 30, 2003, provisional application No. 60/553,115, filed on Mar. 16, 2004.

(51) Int. Cl.
G05B 15/00 (2006.01)
G05B 19/00 (2006.01)

(52) U.S. Cl.
USPC ........... 700/264; 700/245; 700/250; 700/251; 700/252; 700/253; 700/262

(58) Field of Classification Search
USPC .................................................. 700/264–265
See application file for complete search history.

(56) References Cited

U.S. PATENT DOCUMENTS

| | | | |
|---|---|---|---|
| 4,639,878 A * | 1/1987 | Day et al. | 700/259 |
| 4,888,708 A * | 12/1989 | Brantmark et al. | 700/264 |
| 4,954,762 A * | 9/1990 | Miyake et al. | 318/568.19 |
| 5,333,242 A * | 7/1994 | Watanabe et al. | 700/254 |
| 5,988,855 A * | 11/1999 | Marobin | 700/145 |
| 6,330,493 B1 * | 12/2001 | Takahashi et al. | 700/245 |
| 6,778,867 B1 * | 8/2004 | Ziegler et al. | 700/79 |
| 7,010,390 B2 * | 3/2006 | Graf et al. | 700/245 |
| 7,200,260 B1 * | 4/2007 | Watanabe et al. | 382/153 |

(Continued)

FOREIGN PATENT DOCUMENTS

| | | |
|---|---|---|
| EP | 0 521 440 A2 | 1/1993 |
| JP | 63 0216105 A | 1/1989 |
| WO | WO 91/04522 A1 | 4/1991 |

*Primary Examiner* — Bhavesh V Amin
(74) *Attorney, Agent, or Firm* — Venable LLP; Eric J. Franklin; Jeffri A. Kaminski

(57) ABSTRACT

A system of manipulators including several manipulators, namely robots and/or external axes, such as workstations or transport tracks, whereby each manipulator is controlled by a control system via communication means and is programmed to carry out a plurality of tasks. The system of manipulators is movable in a first coordinate system. A second coordinate system is defined for each manipulator, so that one part of the manipulator, e.g. its tool center point, stands still in the second coordinate system, which is movable relative to the first coordinate system.

6 Claims, 4 Drawing Sheets

(56) References Cited

U.S. PATENT DOCUMENTS 7,620,478 B2 * 11/2009 Fortell et al. .................. 700/247
2005/0004707 A1 * 1/2005 Kazi et al. ..................... 700/245
2005/0027394 A1 * 2/2005 Graf et al. ..................... 700/245
2008/0306630 A1 * 12/2008 Fortell et al. .................. 700/251

* cited by examiner

SYSTEM OF MANIPULATORS AND METHOD FOR CONTROLLING SUCH A SYSTEM

CROSS-REFERENCE TO RELATED APPLICATIONS

This application claims priority to U.S. provisional patent application 60/553,115 filed 16 Mar. 2004 and U.S. provisional patent application 60/553,135 filed 16 Mar. 2004 and is the national phase under 35 U.S.C. §371 of PCT/EP2005/051218 filed 16 Mar. 2005.

TECHNICAL FIELD OF THE INVENTION AND PRIOR ART

The present invention concerns a control system, a method and a computer program for controlling one or more manipulators, namely robots and/or external axes such as workstations or transport tracks, comprising program means containing movement instructions for at least one manipulator.

The present invention also concerns a method for programming a single manipulator and a computer program containing computer program code means for making a computer or processor execute the steps of such a method.

The present invention further concerns programming of a robot. The present invention also concerns using a manipulating means to put the robot in different positions.

BACKGROUND ART

An industrial robot comprises a manipulator and a control system for controlling the movements of the manipulator. Many industrial plants utilize systems comprising a control system and a plurality of manipulators, such as a multiple robot system or a system comprising one robot that cooperates with one or more external axes. The manipulators' movements are controlled by one or more programs. The control systems are also usually programmed to execute a plurality of task, performed by the manipulators.

In a typical multi-tasking system comprising at least a control system and multiple manipulators such as a multiple robot system, a system comprising one robot that cooperates with one or more external axes, or a system comprising a control system and one manipulator executes a plurality of programs. Some tasks require manual movement of manipulator in the multi-tasking system, for instance programming a manipulator. Many industrial plants utilize systems comprising a plurality of manipulators, such as a multiple robot system or a system comprising one robot that cooperates with one or more external axes. The manipulators are usually programmed to execute a plurality of tasks and the system comprises path planning means for calculating how the manipulators should move so as to be able to execute the programmed tasks. Certain tasks require two or more of the manipulators to move synchronously whereby the movement instructions in separate manipulator-programs are executed at the same time in order to coordinate the movements of the manipulators.

A manipulator is for instance a rotatable axis that for instance are arranged to rotate a work piece. Another manipulator is for instance composed of interconnected parts. The interconnected parts are for instance robot parts such as a foot, robot arms, arm housing, a wrist and/or a turn disc. Two adjoining robot parts are then connected to each other so as to be rotatable in relation to each other around an axis of rotation, or are linearly displaceable in relation to each other. That a manipulator is movable means that it is able to change its orientation and/or position. To control the relative positions of the interconnected parts, for instance in the control system a coordinate system is defined relative to the manipulator. The interconnected parts are arranged within the coordinate system, with their individual positions defined relative the coordinate system.

Today one robot is able to move with its position defined in such a coordinate system relative an extern rotating axis holding a work piece, the axis and the work piece positions also defined in the coordinate system.

A problem is when the process requires a system of more manipulators than one to work on the work piece is that displacement of one manipulator relative the other manipulators in the system, due to manual movement of the manipulator, leads to a time-consuming manual correction of the mutual positions of the manipulators in the system.

SUMMARY OF THE INVENTION

The object of the present invention is to provide a method for moving all manipulators together in a synchronized motion when one of the manipulators is moved.

The present invention concerns a system of manipulators placed in a first coordinate system, namely a Cartesian system, defining the room the manipulator system is placed in. It also concerns a second coordinate system, movably defined in the first coordinate system. The second coordinate system is attached to one manipulator. The manipulator moves the second coordinate system in that moving the second coordinate system is the same as moving the manipulator-system.

At least one manipulator is in a system of manipulators namely robots and/or external axes. Each manipulator is controlled by a control system and programmed to carry out a plurality of tasks. The manipulator is manipulated by a manipulating means comprising communication means communicating with the control system. Each manipulator is movably oriented in a first coordinate system. Each manipulator is also fixedly in a second coordinate system that can be unique for each manipulator. The second coordinate system is movable relative to the first coordinate system.

In an exemplary embodiment of the invention an industrial robot system comprise at least one manipulator and a control system. The controls system is programmed to make the manipulator carry out a plurality of movement tasks. The industrial robot system also comprises at least one further manipulator. The manipulator are arranged to be moved in a first coordinate system. Each manipulator includes a spatially defined second coordinate system. Each second coordinate system is movably defined in the first coordinate system. The relative position of the spatially defined second coordinate systems is fixed in a system of coordinates, such that upon movement, the second coordinate systems keep said relative position in the first coordinate system.

In another exemplary embodiment of a manipulator, in a system of manipulators according to the invention, moving the second coordinate system in the first coordinate system is moving a manipulator.

In another exemplary embodiment of a manipulator, in a system of manipulators according to the invention, moving one second coordinate system in the first coordinate system is moving a part of the manipulator fixed in that second coordinate system.

In another exemplary embodiment of a manipulator, in a system of manipulators according to the invention, moving a second coordinate system in the first coordinate system is moving at least one second manipulator.

In another exemplary embodiment of a manipulator, in a system of manipulators according to the invention, the second coordinate system in the first coordinate system is moving the system of manipulators.

In another exemplary embodiment of a manipulator, in a system of manipulators according to the invention, at least one manipulator comprises means to receive movement commands from the control system.

In another exemplary embodiment of a manipulator, in a system of manipulators, according to the invention, at least one second manipulator in the control system is operating as only operating in a second coordinate system.

In another exemplary embodiment of a manipulator, in a system of manipulators, according to the invention, at least one manipulator is manipulated by a handheld control tool comprising communication means to communicate with the control system.

In another exemplary embodiment of a system of manipulators according to the invention, one of the manipulators is moving one spatially defined second coordinate system keeping the relative position to the other second coordinate system.

In another exemplary embodiment of a system of manipulators according to the invention, moving one second coordinate system is moving all second coordinate system keeping the relative positions.

In an exemplary embodiment of a handheld manipulating means to manipulate a manipulator a system of manipulators according to the invention, that the handheld manipulating means comprise a manipulator input means such as a joystick, a touch display (10), and/or key buttons (9), starting pre-programmed movement commands.

In another exemplary embodiment of a handheld manipulating means to manipulate a manipulator a system of manipulators according to the invention, the hand-held manipulating means is used to manipulate the manipulators manually.

In another exemplary embodiment of a handheld manipulating means to manipulate a manipulator a system of manipulators according to the invention, the hand-held manipulating is used to program a manipulator.

In an exemplary embodiment of a control system according to the invention, said control system comprises means to define a first fixed coordinate system and at least a second movable coordinate system, in that the second coordinate systems are movable in the first coordinate system.

In an exemplary embodiment of a control system according to the invention, moving a second coordinate system origin in the second coordinate system is moving that second coordinate system.

In an exemplary embodiment of a control system according to the invention, said control system comprises means to communicate with at least one manipulator, and means to send manual movement commands to said manipulator.

In an exemplary embodiment of a method according to the invention, at least one manipulator in a system of manipulators namely robots and/or external axes is controlled. Each manipulator is controlled by a control system and programmed to carry out a plurality of tasks. The manipulator is manipulated by a manipulating means comprising communication means communicating with the control system. Each manipulator is brought to be movably oriented in a first coordinate system. Each manipulator is also fixedly oriented in a second coordinate system that can be unique for each manipulator. The second coordinate system is brought to be moved relative to the first coordinate system.

In an exemplary embodiment of a method according to the invention, an industrial robot system comprises at least one manipulator and a control system and programmed to carry out a plurality of movement tasks, the system comprise at least one further manipulator. The manipulators are brought to be moved in a first coordinate system. Each manipulator is brought to include a spatially defined second coordinate system. Each second coordinate system is brought to be movably defined in the first coordinate system. The relative position of the spatially defined second coordinate systems is brought to be fixed in system of coordinates, such that all the second coordinate systems keep said relative position in the first coordinate system during movement.

In another exemplary embodiment of a method according to the invention, that the robot system is moved by moving the second coordinate system.

In another exemplary embodiment of a method according to the invention, the robot system is moved by a man-machine interface means comprising communication means to communicate with the control system.

In another exemplary embodiment of a method according to the invention, a man-machine interface is used to programme the actual movement of at least one manipulator.

Use of a manipulator according to an embodiment of the invention in a spot welding process, an arc welding process, lifting heavy units, a process comprising laser tools, or any mechanical work such as drilling or driving in rivets.

A control system comprising program means that contain movement instructions for at least one manipulator and path planning means. The path planning means is used to tell said at least one manipulator how to move in order to be able to execute a programmed task. The path planning means transmits the movement instructions to one or more drive modules, such as servomechanisms, to drive the, or each, manipulator in accordance with the movement instructions.

An advantage with the invention is that the robots performance is during processing.

An advantage with the invention is that the tool center points and the work piece is fixed relative each other when moving them as a whole. With an embodiment according to the invention the invention for example the tools and the work piece will not collide.

BRIEF DESCRIPTION OF THE DRAWINGS

The present invention will be described in more detail in connection with the enclosed schematic drawings.

DESCRIPTION OF THE PREFERRED EMBODIMENTS

Figure 1:
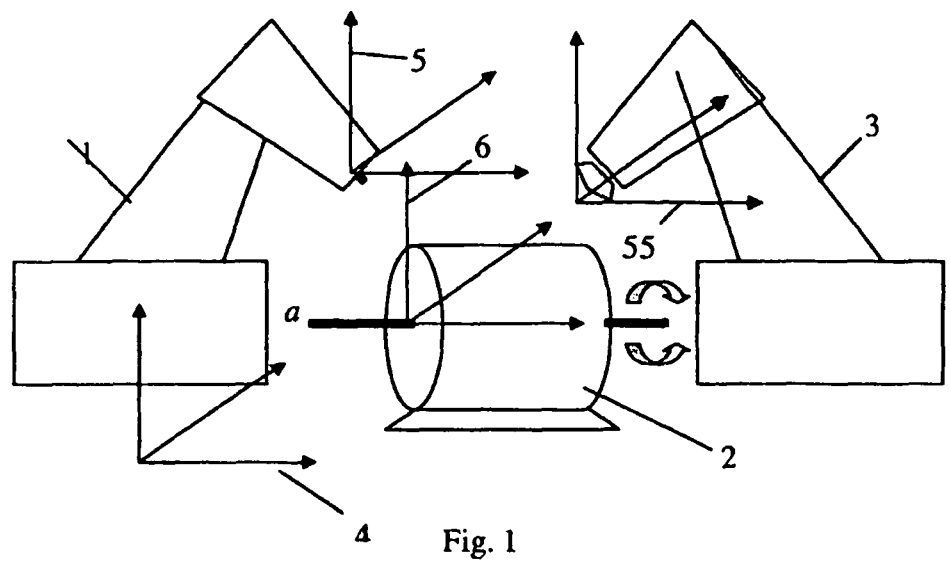
FIG. 1 shows a schematic diagram of a two-robot system to which the present invention is applicable.

FIG. 1 shows a two-robot system comprising manipulators: two robots 1, 3 and an external axis 2, such as a workstation that conveys and positions work pieces mounted thereon. The external axis 2 rotates about an axis, a. Robot 1 is a welding robot mounted on a mobile base. Mounting a robot on a mobile base extends the reach of the robot arm and increases the size of the robot workspace. The additional degrees of freedom in the mobility of the manipulator are however not a problem if a control system according to the present invention is used to control the mobile manipulator. The additional degrees of freedom are in fact turned to advantage by using them to accomplish additional tasks specified by an operator. Robot 3 is mounted on a stationary base and comprises a tool, such as a welding gun, mounted on the robot to execute specified work on work pieces mounted on the rotatable external axis 2.

The robots 1, 3 comprise interconnected parts such as, a foot, manipulator arms, arm housing, a wrist and a turn disc. Two adjoining robot parts are connected to each other so as to be rotatable in relation to each other around an axis of rotation, or are linearly displaceable in relation to each other. A first coordinate system 4 is defined to define the room. Each individual manipulator: robot or work piece is defined in the first coordinate system. To control the relative positions of the interconnected robot parts in the robot programs, the parts are arranged in the first coordinate system corresponding to the physical room a first coordinate system 4.

As the manipulators, here the robots and the external axis are connected to the control system one by one; the control system first regards the manipulators as standing in the same place in the coordinate system. To define each manipulator position according to the first coordinate system the robot system has to be calibrated. The calibration for instance is done by defining common points. One defined point on each manipulator is put together so as they meet. This is done for a number of points; those points are defined relative to the first coordinate system. In the first coordinate system each manipulator now has an individual position. In the coordinate system each tool center point (TCP) that is in the point where the manipulator is working at, such as the welding gun opening point is defined relative the robot foot. After the calibration the control system has information on all manipulators positions relative to the first coordinate system and each other.

For each manipulator a second coordinate system is defined. The second coordinate systems are defined in the first coordinate system, in the control system. Relative to the first coordinate system a point is chosen as origin in each second coordinate system 5, 6, 55. These second coordinate systems are moveable in the first coordinate system. One part of the manipulator for instance the tool center point is defined as standing still in the second coordinate system attached to that manipulator. That means that the robots are moving along with the second coordinate system, when it moves in the coordinate system.

The work piece on the external axis 2 is moved during the welding and their location is also expressed in the robot programs using the second coordinate system 6 of the external axis 2, as the second coordinate set. The two welding robots 1, 3 are defined in two second coordinate system, 5, 55, one coordinate system to each robot. The second coordinate systems 5, 6, 55 relative positions are defined in the first coordinate system. When one of the second coordinate systems is moved in the first coordinate system the second coordinate systems keep their relative positions. The manipulators move along with the second coordinate systems. As the external axis 2 rotates, its coordinate system 6 rotates correspondingly, and the two robots move along. In this case a Cartesian system is used.

That means that there are three cases:
1. A robot is moving in the first-coordinate system and is moving in the second coordinate system.
2. A robot is moving in the first coordinate system even though it is standing still in the second coordinate system.
3. A robot is standing still in the first-coordinate system and is standing still in the second coordinate system.

Figure 2:
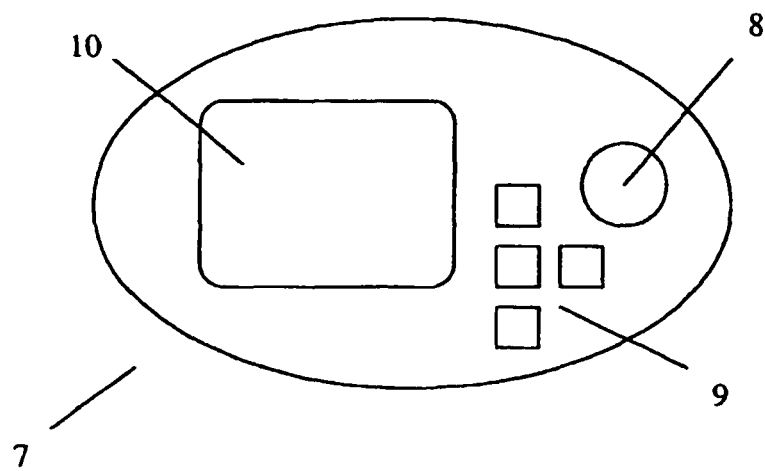
FIG. 2 shows a manipulating means a handheld control tool to which the present invention is applicable.

FIG. 2 shows a manipulating means, in this case a handheld control tool 7. The handheld control tool is used for manually manipulating the robot. The handheld control tool comprises a manipulator input means such as a joystick 8, input buttons 9 and a touch display 10. The manipulating means also comprise a communication means to communicate with the control program. Each single robot has an individual set of programs in the control system. It is the same program or different programs for each robot. The control program for instance comprises basic programs such as programs comprising movement commands.

To manipulate a manipulator into a preferred position, the operator use the input means to choose a movement command. The communication means then sends the input command to the control system and the control system sends the corresponding movement commands to the manipulator.

Although the embodiment discloses a handheld control tool the manipulating means can be any kind of man-machine interface. For instance any handheld moveable control unit such as an intelligent joystick, touch screen means, key button means or cordless communication means or even a personal computer (PC). The manipulating means can communicate with the control system with any input means, such as a joystick, key button means or a touch screen. During the manipulating movement an application program controlling the movements is run.

During a coordinated manual movement task, when one of the manipulators, or part of a manipulator, such as a manipulator arm, is displaced or rotated, this displaces or rotates the coordinate system in which the other manipulators is attached. It is important to know exactly how the coordinate system has been displaced or rotated so that other manipulators can be directed to the programmed positions. Certain tasks require two or more of the robots to move synchronously for example when moving the system in position for programming a movement instruction comprising separate movement instructions in separate manipulator-programs in order to coordinate the movements of the manipulators.

Figure 3:
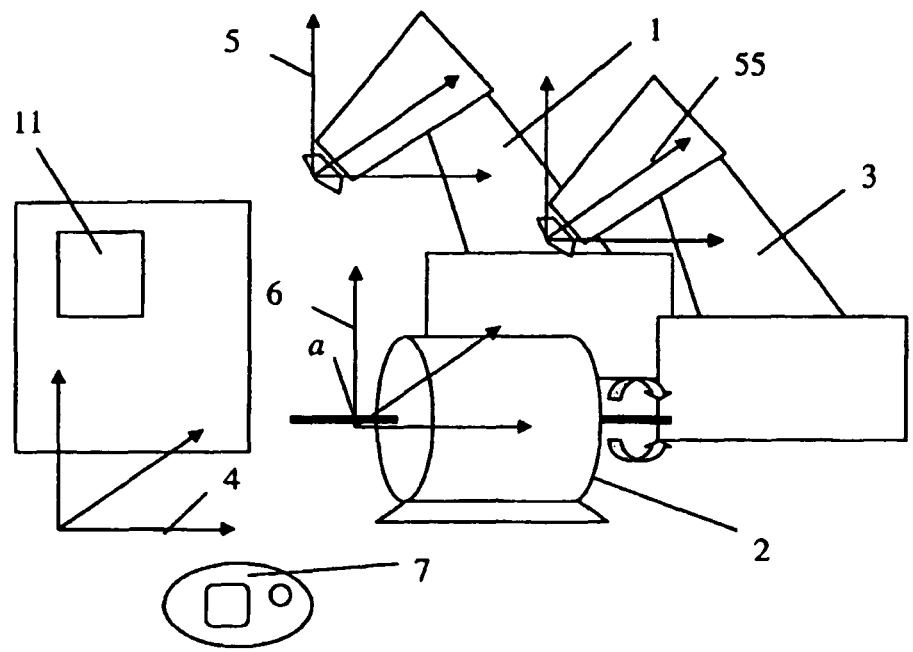
FIG. 3 shows a system according to which the present invention is applicable.

FIG. 3 shows a system of two robots, 1, 3, an external axis 2, a computer means 11, comprising at least a Central Processing Unit (CPU) and a memory, and a handheld control tool 7. The two-robot system also comprises sensor means on axis, a, to measure the rotation of the external axis 2.

After calibrating the system the control system has information on the different positions of the robots and the external axis position relative to the first coordinate system 4. One manipulator in this case robot 1, is chosen as the first manipulator. The origin of the movable second coordinate system 5 is defined as moving along with the TCP of robot 1 and the origin of the movable second coordinate system 55 is defined as moving along with the TCP of robot 12.

The manipulator and the external axis are now handled as a system that is controlled and moved synchronized. The manipulators are placed in a work position and the second coordinate systems are defined relative to each other. Now when the first manipulator is activated, the first manipulator moves all three second coordinate systems. That is each manipulator is moved synchronized and accompanying when a point in the second coordinate system is moved. Within the second coordinate system each manipulator tool center point is fixed for instance relative the work piece as if the manipulators: the robots and the work piece were a single system. Thus the manipulators move together in a synchronized motion, like if they were attached to each other, as one single unit comprising the same number of axes as the robots and the external axes together.

When moving the first manipulator robot 1, robot 3 is therefore able to move to the corresponding positions relative axis 2, the work piece, and the first coordinate system. The work piece is active also when manipulating the system, enabling all robots to maintain orientation in relation to work piece. Tools held by the robots will thus have the right orientation and they will be guided to the right place on the work piece.

Figure 4:
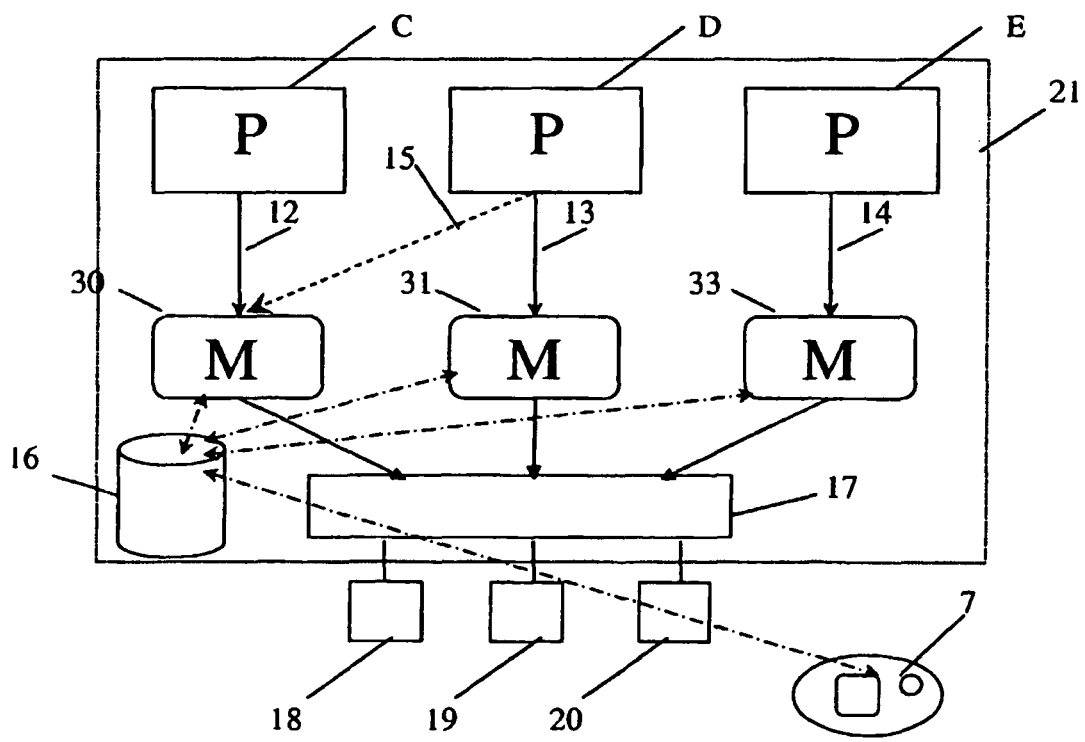
FIG. 4 shows the communication between the control system and the manipulating means.

FIG. 4 shows a controls system 21 installed on a computer and a manipulating means. The control system controls a three-mechanical unit system such as the systems shown in FIGS. 1 and 3 comprising three manipulators, two robots and an external axis. The picture also shows the communication between the control system 21 and the manipulating-means 7. The control system 1 comprises three mechanical-unit programs C, D, E containing instructions such as "STOP", "START" and "WAIT" and also movement instructions such as "MOVE TO" for each mechanical unit. The control system 1 also comprises a plurality of program planners 30,31,33 that tell said at least one mechanical unit how to move in order to be able to execute a programmed task. Each manipulator-program C, D, E, is connected to only one path planner 30, 31, 33, at any given time. Arrows 12, 13, 14 in FIG. 2 show that each manipulator-program C, D, E, is connected to a different path planner 30,31,33, so when the manipulator-programs are run, each manipulator will move independently. The control system 1 comprises means to switch the manipulators from independent to synchronised movement. If the manipulator-programs C and D are to be synchronised, the control system disconnects manipulator-program E from path planner 10 and connects program D to path planner 30. When manipulator-programs C and D need to be synchronised, they are both connected to path planner 30 as indicated by arrows 12 and 15 in FIG. 2.

The path planners 30, 31, 33, communicate with a central data storage means 16 that contains position and status data transmitted from each of the three manipulators. The manipulating means also communicate with the central data storage means. The message exchanging, or communication, between the path planners and the central data storage means or by the manipulating means and the central data storage is indicated by double-headed arrows in FIG. 4. In this way the path planners 30, 31, 33 receive updated information on whether, and how, the three manipulators have moved as well as about the status of the manipulators. After a manipulator has been displaced and/or rotated the path planner calculates the position and/or orientation of that manipulator's coordinate system before providing manual movement instructions for a manipulator working in that coordinate system.

Movement instructions are then transmitted to drive modules 18, 19, 20 associated with each manipulator via a main computer interface 17 so that the corresponding manipulators are able to move to the manual manipulated positions.

Figure 5:
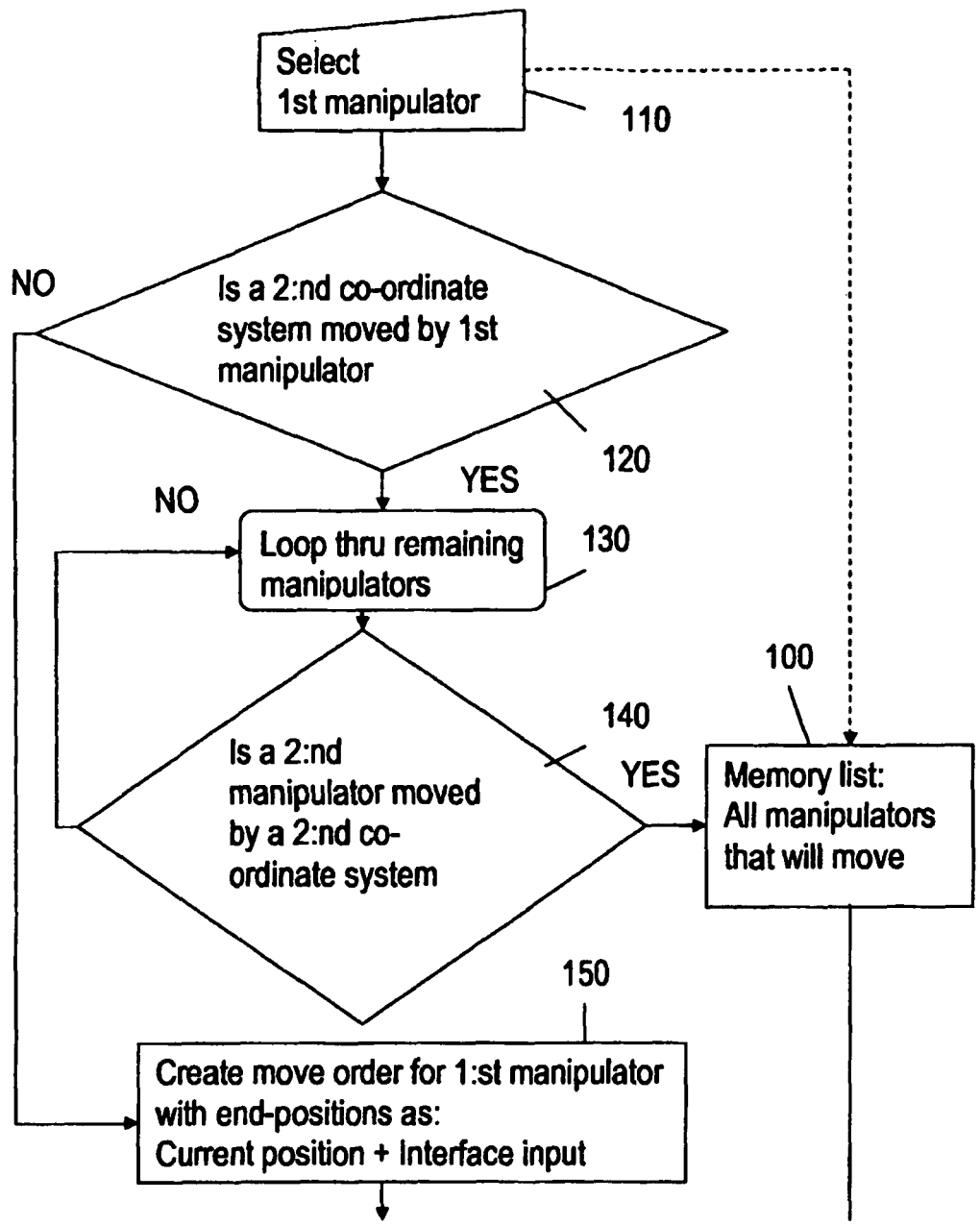
FIG. 5 shows a flow chart describing the method according to an embodiment of the invention.
Figure 5:
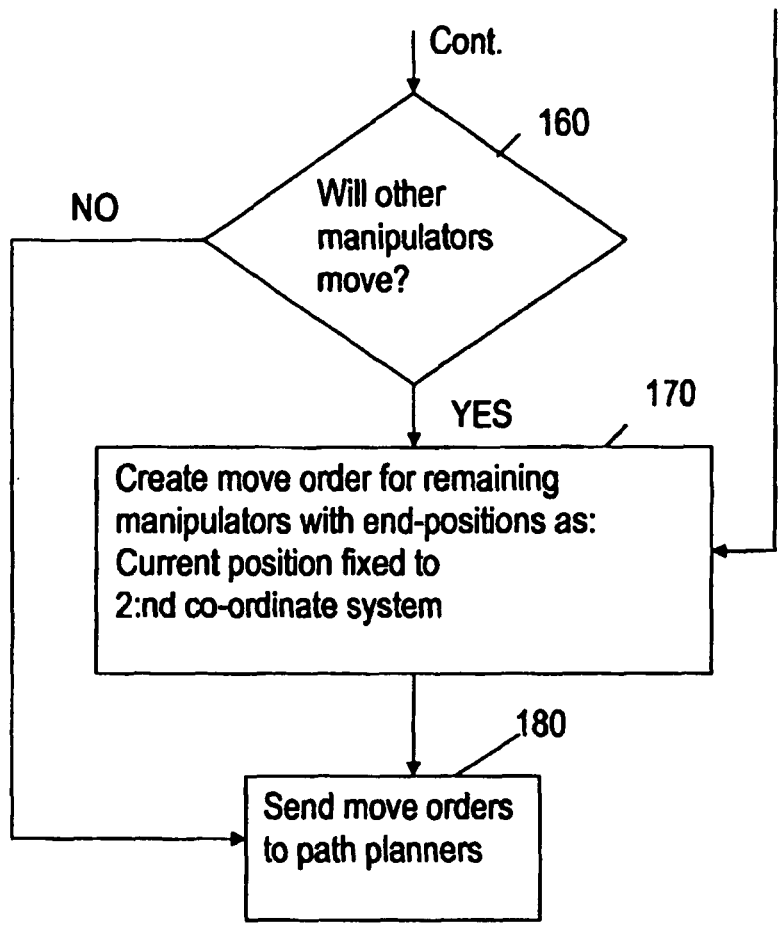

FIG. 5 shows a flow chart describing the method according to an embodiment of the invention.

The method comprises the steps of:
Create a memory list for all manipulators that will move. (100)
Select first manipulator, go to 100 then 120. (110)
Is a second coordinate system moved by first manipulator, (120) go to 130 else go to 150.
Loop thru remaining manipulators, (130)
Is a second manipulator moved by a second coordinate system (140) go to 100 else go to 130.
Create move order for first manipulator with end-positions as: (150) current position and man-machine interface contribution.
Will other manipulators move? Go to 170 else 180, (160)
Create move order for remaining manipulators with (170) end-positions as:
Current position fixed to second coordinate system.
Send move orders to path planners. (180)

One feature of the method according to the invention is that a manipulator can be moving although it in the second coordinate system stands still.

The first manipulator can be chosen as any manipulator of the system. The leading manipulator can also be changed at any time during the manipulation of the system. A manipulator can be disconnected from the system, the control program then has access to information of the number of active manipulators. If one robot is disconnected, it stands still relative to the first coordinate system.

A system according to a preferred embodiment of the invention comprises one or several manipulators, a manipulating means, and a computer means:
more than one robot, for example 2, 3 or 4 robots,
more then one work pieces,
more then one manipulating means.

For instance two robots are holding a work piece and two robots are working on the work piece or one robot and one manipulator. The work piece is for instance a car body.

The first coordinate system origin can be chosen as any point.

The use of the equipment according to the present invention is in industrial processing such as but not limited too spot welding, arc welding, lifting heavy units, laser processes and any mechanical work: drilling, driving in rivets, to maximize the use of the robots performance during said processing. The use of the equipment according to the present invention is also for instance as programming tool.

Although the embodiments disclosed describe a three-manipulator-system, the control system according to the present invention can be used to control any number of manipulators from a single controller. Addition of a manipulator to a particular system requires only the addition of a configuration file into the inventive control system.

The invention is of course not in any way restricted to the preferred embodiments thereof described above, but many possibilities to modifications thereof would be apparent to a man with ordinary skill in the art without departing from the basic idea of the invention as defined in the appended claims.

The invention claimed is:

1. A system including at least two manipulators each programmed to carry out a plurality of tasks, the system comprising:
a controller configured to control the manipulators; and
a handheld control tool for manually manipulating the manipulators, said handheld control tool comprising a communication unit configured to communicate with the controller, wherein each manipulator is movably oriented in a first coordinate system, wherein a second coordinate system is defined for each manipulator so that one part of each manipulator stands still in the second coordinate system, and wherein each second coordinate system is movable relative to the first coordinate system,
wherein the controller is configured to switch the manipulators between independent movement and synchronized movement and, if synchronized movement is selected, receive information on which of said manipulators is selected as a leading manipulator, and which manipulators are to be moved synchronously with the leading manipulator, receive a movement command from the handheld control tool, create a move order for the leading manipulator, based on the received movement command and a current position of the leading manipulator, and create move orders for the manipulators to be moved synchronously with the leading manipulator, such that said parts of the manipulators, which stand still in the second coordinate systems, are moved such that the parts maintain positions relative to the second coordinate system of the leading manipulator, thereby controlling the manipulators such that the manipulators move together in a synchronized motion when the leading manipulator is manually moved utilizing said handheld control tool.

2. The system according to claim 1, wherein said hand held control tool comprises a manipulator input member comprising a joystick.

3. A method for controlling a system of manipulators including at least two manipulators, wherein each manipulator is movably oriented in a first coordinate system, the system comprising a handheld control tool for manually manipulating the manipulators, the method comprising:

defining a second coordinate system for each manipulator so that one part of said manipulator stands still in the second coordinate system, wherein each second coordinate system is movable relative to the first coordinate system, selecting one of said manipulators as a leading manipulator, creating a memory list including all manipulators that are to be moved synchronously with the leading manipulator, receiving a movement command from the hand held control tool, creating a move order for the leading manipulator, based on the received movement command and a current position of the leading manipulator, and creating move orders for the remaining manipulators in the memory list, such that parts of the manipulators, which stand still in the second coordinate systems, are moved such that the parts maintain positions relative to the second coordinate system of the leading manipulator, thereby controlling the manipulators such that the manipulators move together in a synchronized motion when the leading manipulator is manually moved utilizing said handheld control tool.

4. The method according to claim 3, wherein said hand held control tool comprises a manipulator input member comprising a joystick creating a movement command by using the joystick.

5. The method according to claim 3, wherein the at least two manipulators comprise at least one of robots or external axes.

6. The system according to claim 1, wherein the at least two manipulators comprise at least one of robots or external axes.

* * * * *

UNITED STATES PATENT AND TRADEMARK OFFICE
CERTIFICATE OF CORRECTION

| | | |
|---|---|---|
| PATENT NO. | : 8,588,981 B2 | Page 1 of 1 |
| APPLICATION NO. | : 10/593272 | |
| DATED | : November 19, 2013 | |
| INVENTOR(S) | : Fortell et al. | |

It is certified that error appears in the above-identified patent and that said Letters Patent is hereby corrected as shown below:

Title Page, below Item (65) should read

-- (60) Related U.S. Application Data

Provisional application No. ~~60/533,135~~ 60/553,135, filed on ~~Dec. 30, 2003~~ Mar. 16, 2004, provisional application No. 60/553,115, filed on Mar. 16, 2004 --.

Signed and Sealed this
Eleventh Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,588,981 B2  
APPLICATION NO. : 10/593272  
DATED : November 19, 2013  
INVENTOR(S) : Nortell et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2089 days.

Signed and Sealed this  
Fifth Day of May, 2015

Michelle K. Lee  
*Director of the United States Patent and Trademark Office*